(12) United States Patent
Zou

(10) Patent No.: US 9,179,242 B2
(45) Date of Patent: Nov. 3, 2015

(54) SYSTEMS AND METHODS FOR REGISTERING MACHINE TYPE COMMUNICATIONS DEVICES AND SCHEDULING MACHINE TYPE COMMUNICATIONS DEVICE TRANSMISSIONS

(71) Applicant: Alcatel-Lucent USA Inc., Murray Hill, NJ (US)

(72) Inventor: Jialin Zou, Randolph, NJ (US)

(73) Assignee: Alcatel Lucent, Boulogne-Billancourt (FR)

(*) Notice: Subject to any disclaimer, the term of this patent is extended or adjusted under 35 U.S.C. 154(b) by 288 days.

(21) Appl. No.: 13/857,739

(22) Filed: Apr. 5, 2013

(65) Prior Publication Data

US 2014/0302846 A1    Oct. 9, 2014

(51) Int. Cl.
*H04W 4/00*        (2009.01)
*H04W 52/24*       (2009.01)
*H04W 72/12*       (2009.01)
*H04W 28/02*       (2009.01)
*H04W 52/10*       (2009.01)
*H04B 17/318*      (2015.01)

(52) U.S. Cl.
CPC ............. *H04W 4/005* (2013.01); *H04B 17/318* (2015.01); *H04W 28/0289* (2013.01); *H04W 52/245* (2013.01); *H04W 72/1268* (2013.01); *H04W 52/10* (2013.01)

(58) Field of Classification Search
CPC .............. H04W 4/005; H04W 52/245; H04W 72/1268; H04W 28/0289; H04W 52/10; H04B 17/318
USPC ........ 455/435.1, 450, 451, 452.1–452.2, 522, 455/561, 458
See application file for complete search history.

(56) References Cited

U.S. PATENT DOCUMENTS

| 8,416,741 | B2 * | 4/2013 | Chan et al. .................. 370/329 |
| 8,797,989 | B2 * | 8/2014 | Lee .............................. 370/329 |
| 2011/0201307 | A1 * | 8/2011 | Segura ......................... 455/411 |

(Continued)

FOREIGN PATENT DOCUMENTS

EP    2670172 A1    12/2013

OTHER PUBLICATIONS

International Search Report dated Sep. 8, 2014 in PCT Application No. PCT/US2014/032646.

*Primary Examiner* — Brandon Miller
(74) *Attorney, Agent, or Firm* — Harness, Dickey & Pierce, P.L.C.

(57) ABSTRACT

Methods of registering a Machine Type Communications (MTC) device for scheduling MTC device transmissions by a network element are provided. The method includes registering a MTC device. The registering includes assigning at least one resource block to the MTC device for transmitting at least one MTC device transmission. The registering includes establishing a triggering mechanism that detects when a trigger event occurs, such that when the trigger event occurs, the MTC device transmits the at least one MTC device transmission on the assigned at least one resource block. The registering includes configuring the network element to receive the at least one MTC device transmission based on the assigned resource block and the established triggering mechanism. The method includes allowing the MTC device to transmit the at least one MTC device transmission over the resource block that is assigned during the registration.

15 Claims, 5 Drawing Sheets

(56) References Cited

U.S. PATENT DOCUMENTS

| | | | |
|---|---|---|---|
| 2011/0310769 A1* | 12/2011 | Lee et al. | 370/254 |
| 2012/0063305 A1* | 3/2012 | Chiu et al. | 370/230 |
| 2012/0149383 A1* | 6/2012 | Wang et al. | 455/450 |
| 2012/0226930 A1* | 9/2012 | Colban et al. | 713/340 |
| 2013/0017856 A1* | 1/2013 | Murias et al. | 455/522 |
| 2013/0272236 A1* | 10/2013 | Beale | 370/329 |
| 2014/0153417 A1* | 6/2014 | Gupta et al. | 370/252 |
| 2015/0023281 A1* | 1/2015 | Wu | 370/329 |

* cited by examiner

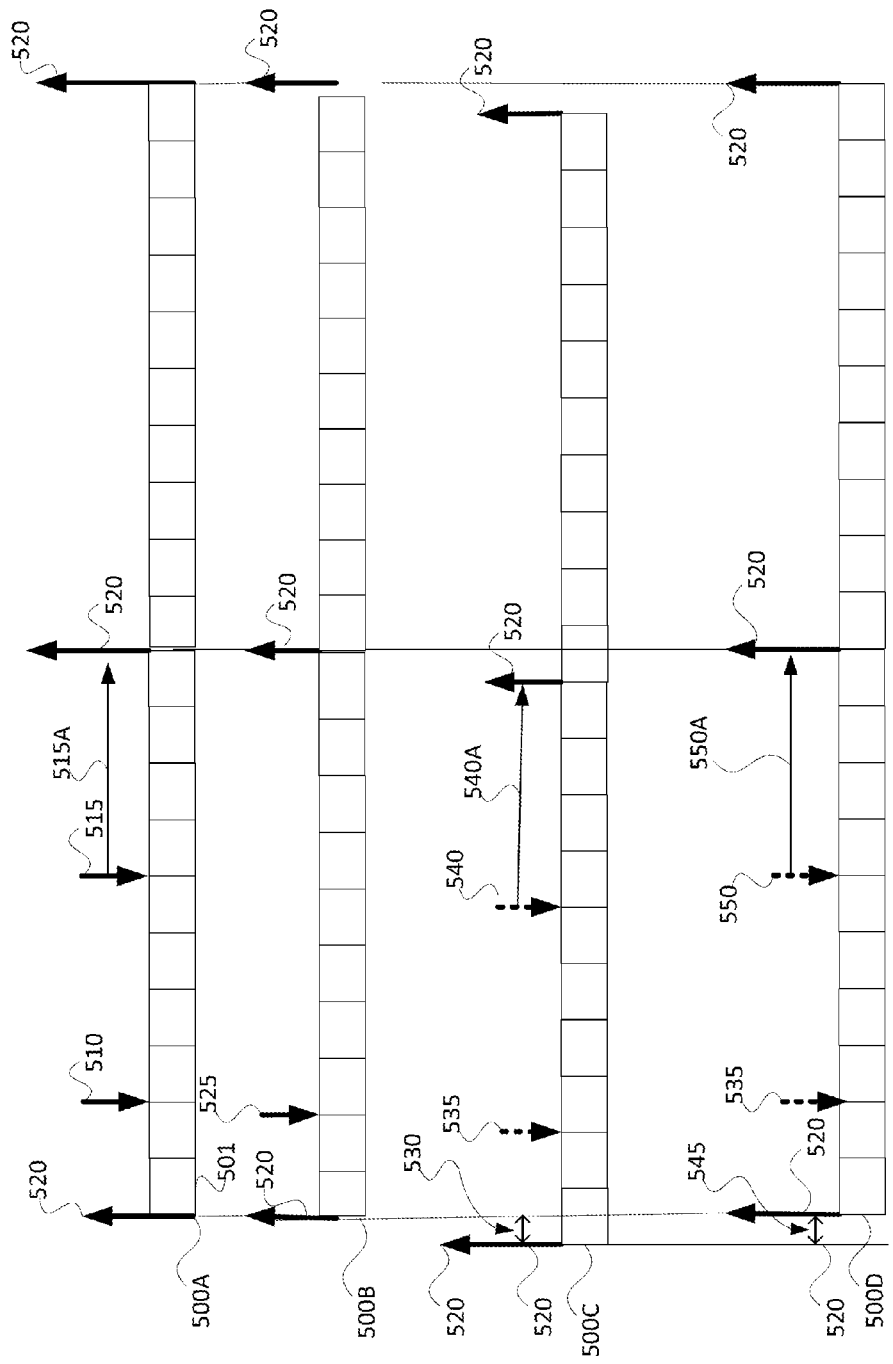

SYSTEMS AND METHODS FOR REGISTERING MACHINE TYPE COMMUNICATIONS DEVICES AND SCHEDULING MACHINE TYPE COMMUNICATIONS DEVICE TRANSMISSIONS

BACKGROUND

Current wireless cellular systems are designed to serve user terminals and their applications, in order to allow the continuous streaming of data (e.g., voice and/or video) during a communications session. For these types of applications, when a communications link between a user terminal and a base station is enabled, the communications link is expected to last for a relatively long period of time. Additionally, setting up one or more channels for a communications link between a mobile terminal and a base station may require the mobile terminal and the base station to send and receive various control and signaling data prior to starting a streaming session (e.g. signaling procedures for traffic channel access). Once the communications link is established, other signaling protocols, such as scheduling protocols, may be used to avoid signal interference with other data transmissions. Furthermore, even when a user terminal enters an "idle mode" (i.e., when no data is being transmitted) in order to reduce the amount of signaling that takes place during a communications session, the user terminal may be required to send and receive various control and signaling data prior to entering an "active mode". These control and signaling procedures may require a substantial amount of network resources.

In contrast to user terminals, Machine Type Communications (MTC) devices and their applications may only need to transmit a relatively small amount of data during a relatively short amount of time (as compared to data streaming). Additionally, MTC devices stay in idle mode and rarely change locations. Because MTC devices may only require relatively short data transmissions, and due to their stationary nature, requiring MTC devices to undertake the aforementioned control and signaling procedures may be a very inefficient use of existing network resources. In many instances, the network resources required for a MTC device data transmission is less than the resources required to establish a communications link between the MTC device and a base station. Furthermore, if there are many MTC devices in a base station's service area, the base station may have to handle numerous MTC device transmissions in short period of time, leading to cell overloaded conditions.

SUMMARY

Example embodiments provide systems and/or methods for registering Machine Type Communications (MTC) devices with a network element for scheduling MTC device transmissions.

According to an example embodiment, a method of registering a Machine Type Communications (MTC) device for scheduling MTC device transmissions by a network element includes registering a MTC device. The registering includes assigning at least one resource block to the MTC device for transmitting at least one MTC device transmission. The registering includes establishing a triggering mechanism that detects when a trigger event occurs, such that when the trigger event occurs, the network element receives the at least one MTC device transmission from the MTC device on the assigned at least one resource block. The registering includes configuring the network element to receive the at least one MTC device transmission based on the assigned resource block and the established triggering mechanism. The method includes allowing the MTC device to transmit the at least one MTC device transmission over the resource block assigned during the registration.

Another example embodiment provides a method of scheduling registered Machine Type Communications (MTC) device transmissions by a network element. The method includes detecting that a trigger event has occurred based on a trigger mechanism. The method includes receiving a MTC device transmission from a MTC device associated with the trigger event over a resource block based on the detecting, the resource block being previously assigned to the MTC device such that the network element is not required to perform a signaling procedure with the MTC device in order to transmit the MTC device transmission.

Another example embodiment provides a method of transmitting a Machine Type Communications (MTC) device transmission by a MTC device that is registered with a network element, the network element scheduling MTC device transmissions. The method includes receiving a message indicating that the MTC device is registered with a network element. The message also indicates that at least one resource block is assigned to the MTC device to transmit on. The method also includes transmitting the at least one MTC device transmission over the assigned at least one resource block when a trigger event occurs, the at least one resource block being previously assigned to the MTC device by the network element.

Another example embodiment provides a method of scheduling registered Machine Type Communications (MTC) device transmissions by a network element. The method includes detecting that a trigger event has occurred. The method also includes transmitting a MTC device transmission over a resource block, the resource block being previously assigned to the MTC device such that the MTC device is not required to perform a signaling procedure with the network element in order to transmit the MTC device transmission.

BRIEF SUMMARY OF THE DRAWINGS

The present invention will become more fully understood from the detailed description given herein below and the accompanying drawings, wherein like elements are represented by like reference numerals, which are given by way of illustration only and thus are not limiting of the present invention and wherein:

FIG. 5 illustrates a timing and synchronization diagram according to an example embodiment.

DETAILED DESCRIPTION OF THE EMBODIMENTS

Figure 1:
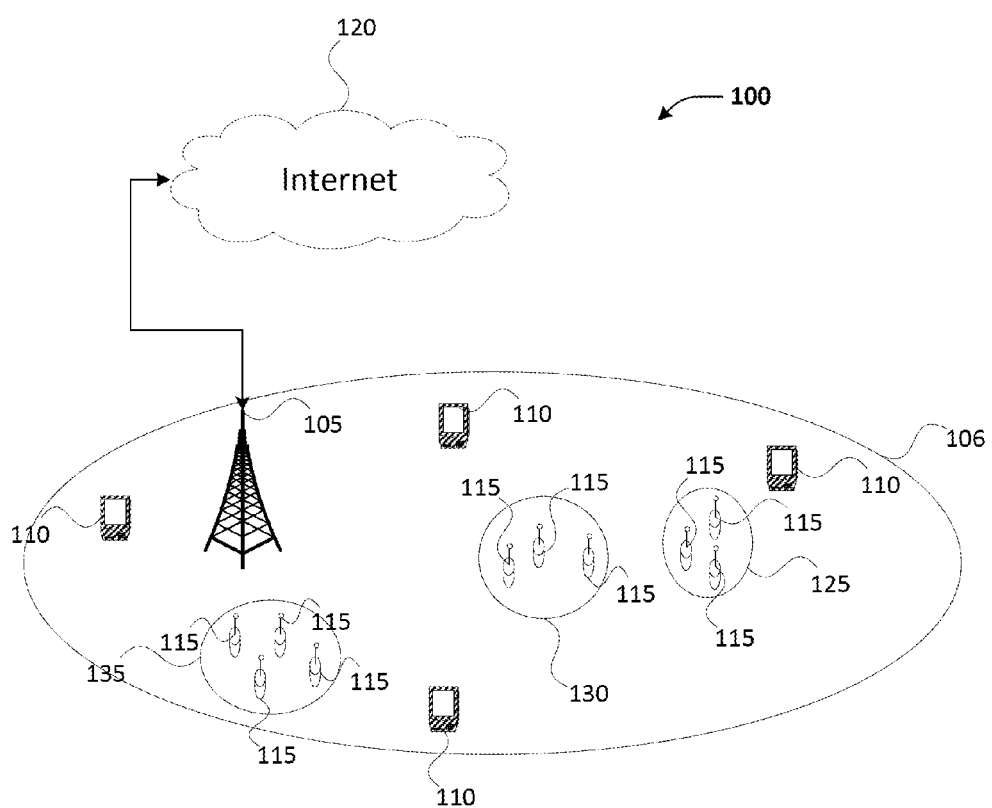
FIG. 1 illustrates an example of a communications network, according to an example embodiment.

Various example embodiments will now be described more fully with reference to the accompanying drawings in which some example embodiments of the invention are shown.

Detailed illustrative embodiments are disclosed herein. However, specific structural and functional details disclosed herein are merely representative for purposes of describing example embodiments of the present invention. This invention may, however, may be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams in order not to obscure the example embodiments in unnecessary detail. In other instances, well-known processes, structures and techniques may be shown without unnecessary detail in order to avoid obscuring example embodiments.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, a function, a procedure, a subroutine, a subprogram, etc. When a process corresponds to a function, its termination may correspond to a return of the function to the calling function or the main function.

Moreover, as disclosed herein, the term "memory" may represent one or more devices for storing data, including random access memory (RAM), magnetic RAM, core memory, and/or other machine readable mediums for storing information. The term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" may include, but is not limited to, portable or fixed storage devices, optical storage devices, wireless channels, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As used herein, the term "user terminal" may be considered synonymous to, and may hereafter be occasionally referred to, as a client, mobile, mobile terminal, mobile unit, mobile station, mobile user, user equipment (UE), subscriber, user, remote station, access agent, user agent, receiver, etc., and may describe a remote user of network resources in a communications network. Furthermore, the term "user terminal" may include any type of wireless/wired device such as consumer electronics devices, smart phones, tablet personal computers, personal digital assistants (PDAs), desktop computers, and laptop computers, for example.

As used herein, the term "network element", may be considered synonymous to and/or referred to as a networked computer, networking hardware, network equipment, router, switch, hub, bridge, gateway, or other like device. The term "network element" may describe a physical computing device of a wired or wireless communication network and configured to host a virtual machine. Furthermore, the term "network element" may describe equipment that provides radio baseband functions for data and/or voice connectivity between a network and one or more users. The term "network element", may be considered synonymous to and/or referred to as a "base station". As used herein, the term "base station", may be considered synonymous to and/or referred to as an enhanced Node B (eNB), base transceiver station (BTS), NodeB, access point (AP), etc. and may describe equipment that provides the radio baseband functions for data and/or voice connectivity between a network and one or more users.

Example embodiments may be utilized in conjunction with RANs such as: Universal Mobile Telecommunications System (UMTS); Global System for Mobile communications (GSM); Advance Mobile Phone Service (AMPS) system; the Narrowband AMPS system (NAMPS); the Total Access Communications System (TACS); the Personal Digital Cellular (PDC) system; the United States Digital Cellular (USDC) system; the code division multiple access (CDMA) system described in EIA/TIA IS-95; a High Rate Packet Data (HRPD) system, Worldwide Interoperability for Microwave Access (WiMAX); ultra mobile broadband (UMB); $3^{rd}$ Generation Partnership Project LTE (3GPP LTE); and $4^{th}$ Generation LTE.

Exemplary embodiments are discussed herein as being implemented in a suitable computing environment. Although not required, exemplary embodiments will be described in the general context of computer-executable instructions, such as program modules or functional processes, being executed by one or more computer processors or CPUs. Generally, program modules or functional processes include routines, programs, objects, components, data structures, etc. that performs particular tasks or implement particular data types. The program modules and functional processes discussed herein may be implemented using existing hardware in existing communication networks. For example, program modules and functional processes discussed herein may be implemented using existing hardware at existing network elements or control nodes (e.g., base station 105 as shown in FIG. 1). Such existing hardware may include one or more digital signal processors (DSPs), application-specific-integrated-circuits, field programmable gate arrays (FPGAs) computers or the like.

FIG. 1 illustrates an example of a communications network, according to an example embodiment. A communications network 100 includes base station 105, cell coverage area 106, internet 120, MTC device group 125, MTC device group 130, MTC device group 135, mobile terminals 110, Machine Type Communications (MTC) devices 115.

Base station 105 may be configured to provide wireless communication services to mobile terminals within a geographic area, or cell coverage area, associated with the base station 105. For example, FIG. 1 shows mobile terminals 110 and MTC devices 115 within cell coverage area 106 provided by base station 105. The base station 105 may provide wireless communication services to mobile terminals 110 and/or MTC devices 115 via a link for each user terminal and/or MTC device. Links between base station 105 and each of the mobile terminals 110 and MTC devices 115 may include one or more downlink (or forward) channels for transmitting information from base station 105 to mobile terminals 110 and MTC devices 115 and one or more uplink (or reverse) channels for transmitting information from mobile terminals 110 and MTC devices 115 to the base station 105.

Base station 105 may include a processor and transmitter/receiver connected to one or more antennas and an electronic switching function. The one or more transmitters/receivers may be configured to transmit/receive data signals to/from one or more user terminals within its cell coverage area (e.g., mobile terminals 110 and MTC devices 115) via one or more links that may be associated with a transmitter and a receiver. In various embodiments, base station 105 may employ an Evolved Node B, (also known as an eNodeB or eNB) to connected with, or otherwise communicate with, mobile terminals (e.g., mobile terminals 110) within base station 105's cell coverage area (e.g., cell coverage area 106).

Base station 105 may be configured to employ one or more wireless communications standards, such as CDMA, GSM, LTE, WiMAX, or other like wireless communications standard. Base station 105 may also be configured to connect to a service provider's network via hard link, such as a packet switched network, a mobile switching center, or via other like connection means. The electronic switching function may be a "Mobile Switching Center" (MSC) when base station 105 employs a GSM, AMPTS, NMT and CDMA system. Alternatively, a "Media Gateway" (MGW)/"Gateway MSC Server" (GMSC) may be used if base station 105 employs a 3G/4G mobile system. In various embodiments, the aforementioned functions may be provided by separate components or devices.

In various embodiments, where base station 105 uses the LTE wireless communication protocol, base station 105 may comprise components of the System Architecture Evolution (SAE) with an Evolved Packet Core (EPC) as described by the 3rd Generation Partnership Project (3GPP). In such embodiments, base station 105 may include components such as a Mobility Management Entity (MME), Serving Gateway (SGW), PDN Gateway (PGW), Home Subscriber Server (HSS), Access Network Discovery and Selection Function (ANDSF), Evolved Packet Data Gateway (ePDG), and/or other like components as are known. In various embodiments, the aforementioned components may be employed by separate devices.

Base station 105 may be configured to operate a channel access method, such as code division multiple access (CDMA), orthogonal frequency-division multiple access (OFDMA), frequency division multiple access (FDMA), single-carrier FDMA (SC-FDMA), time division multiple access (TDMA), packet mode multiple-access, space division multiple access (SDMA), or other like channel access methods or combination thereof.

Base station 105 may also be configured to operate a scheduling algorithm, such as proportional fair, maximum throughput scheduling, or other like scheduling algorithms as is known. The scheduling algorithm may describe a schedule for allocating network resources for every device with base station 105's cell coverage area (e.g. cell coverage area 106), such that each transmission is assigned to a carrier frequency at a time instant.

Base station 105 may be configured to operate a collision detection method, such as a carrier sense multiple access (CSMA) protocol, which is a probabilistic Media Access Control (MAC) protocol in which a device verifies the absence of other traffic before transmitting on a shared transmission medium. The CSMA protocol may employ a collision avoidance (CA) protocol, in which a device only transmits when a channel is sensed to be idle. Alternatively, the CSMA protocol may employ a collision detection (CD) protocol, in which a device terminates a transmission as soon as a collision is detected. However, embodiments are not limited to the collision detection methods described above and may encompass any type of collision detection method. Additionally, the CSMA protocol may be enhanced with a Request-to-Send/Clear-to-Send (RTS/CTS) protocol, in which a device wishing to send data initiates the process by sending a request to send frame (RTS) and the destination device replies with a clear to send frame (CTS).

Each of the mobile terminals 110 may include a transceiver, memory, and processor. Mobile terminals 110 may be configured to send/receive data to/from base stations 150. Mobile terminals 110 may be designed to sequentially and automatically carry out a sequence of arithmetic or logical operations; equipped to record/store digital data on a machine readable medium; and transmit and receive digital data via base station 150. Mobile terminals 110 may include wireless phones, laptop personal computers, tablet personal computers, and/or any other physical or logical device capable of recording, storing, and/or transferring digital data via base station 105. Each of the mobile terminals 110 may include a wireless transceiver configured to operate in accordance with the IEEE 802.11-2007 standard (802.11) or other like wireless standards.

Machine Type Communications (MTC) devices 115 may be any device that requires little (or no) human intervention to communicate with another device (e.g., base station 105). It should be noted that Machine Type Communications may also be referred to as Machine-to-Machine (M2M) communications, and thus, MTC devices 115 may also be referred to as M2M devices. MTC devices 115 may be sensors, meters, or other like devices that can capture and/or record an event (e.g., temperature, electrical output, water usage, inventory level, and the like). Once an event is captured and recorded, such an event may be relayed through a network (e.g., internet 120 via base station 105) and reported to an application or software program. The application or software program may use the captured event to take an appropriate action (e.g., reduce or increase temperature, restock inventory items, and the like). Therefore, MTC devices 115 may be configured to transmit data associated with one or more captured events autonomously or with little to no human intervention (i.e., "reporting"). MTC devices 115 may also be configured to receive data requests. MTC devices 115 may also be configured to be re-configured autonomously, such that MTC devices may re-configure themselves by receiving control data (e.g., receiving control data from base station 105 or from an application via base station 105). Accordingly, each of the MTC devices 115 may include a wireless transceiver configured to operate in accordance with the IEEE 802.11-2007 standard (802.11) or other like wireless standards.

MTC devices 115 may also be a part of a MTC device group (e.g., MTC device group 125, MTC device group 130, or MTC device group 135). MTC devices 115 may be grouped according to an application type. For example, MTC devices 115 within one of MTC device groups 125 may report metered data such as electricity usage, whereas MTC devices within one of MTC device group 130 may report inventory levels. MTC device groups may also be based on MTC devices having the same or similar data reporting times, the same or similar reporting period or cycle, and/or the same or similar maximum data report size. MTC devices 115 may also be grouped according to device type (e.g., temperature meter, electrical meter, and the like).

Figure 2:
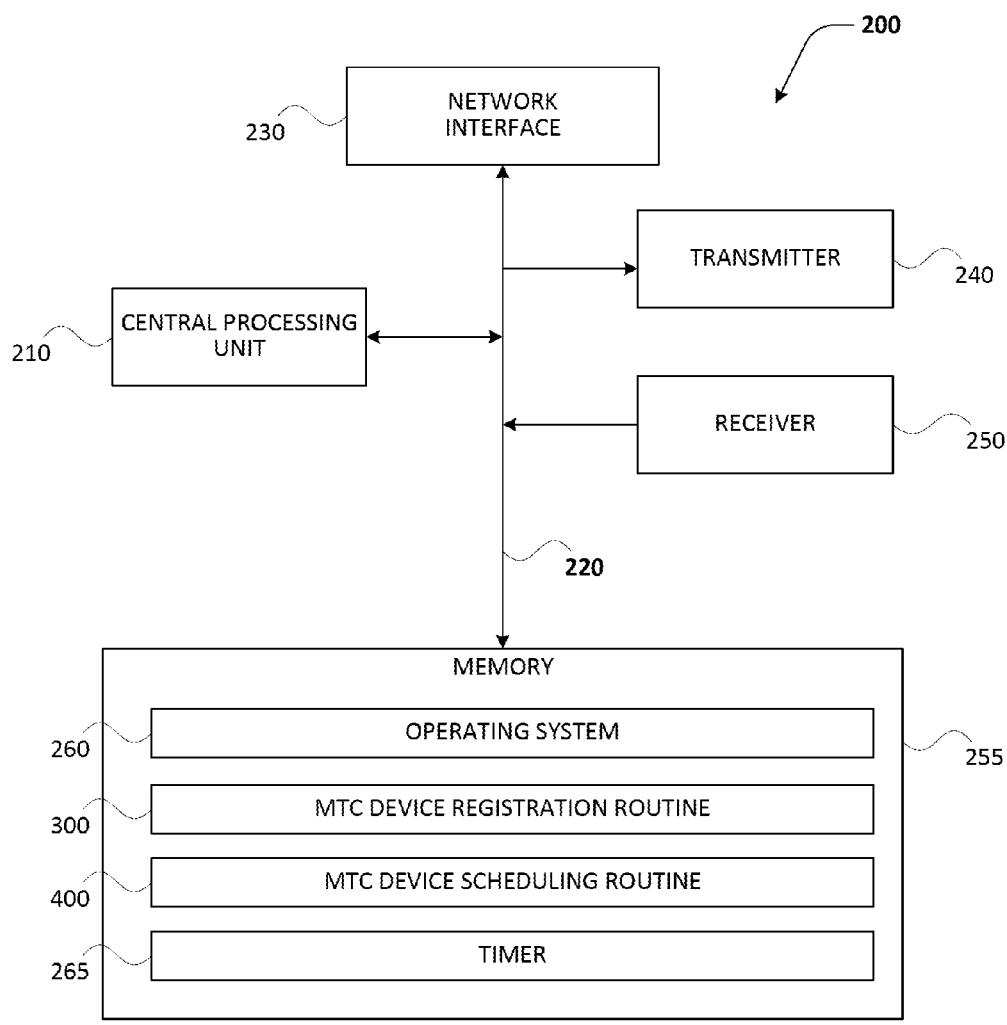
FIG. 2 illustrates the components of a network element being employed by a communication network according to an example embodiment.

FIG. 2 illustrates the components of network element 200 that may be employed by a communication network according to an example embodiment. It should be noted that base station 105 or a device employed by base station 105, as shown in FIG. 1, may have the same or a similar configuration of components as shown in FIG. 2. As shown, network element 200 includes central processing 210, bus 220, network interface 230, transmitter 240, receiver 250, and memory 255. During operation, memory 255 includes operating system 260, MTC device registration routine 300, MTC device scheduling routine 400, and timer 265. In some embodiments, network element 200 may include many more components than those shown in FIG. 2. However, it is not necessary that all of these generally conventional components be shown in order to disclose the illustrative embodiment.

Memory 255 may be a computer readable storage medium that generally includes a random access memory (RAM), read only memory (ROM), and a permanent mass storage device, such as a disk drive. Memory 255 also stores operating system 260 and program code for MTC device registration routine 300, MTC device scheduling routine 400, and timer 265. These software components may also be loaded from a separate computer readable storage medium into memory 255 using a drive mechanism (not shown). Such separate computer readable storage medium may include a floppy drive, disc, tape, DVD/CD-ROM drive, memory card, or other like computer readable storage medium (not shown).

In some embodiments, software components may be loaded into memory 255 via network interface 230, rather than via a computer readable storage medium.

Central processing unit 210 may be configured to carry out instructions of a computer program by performing the basic arithmetical, logical, and input/output operations of the system. Instructions may be provided to central processing unit 210 by memory 255 via bus 220.

Bus 220 enables the communication and data transfer between the components of network element 200. Bus 220 may comprise a high-speed serial bus, parallel bus, storage area network (SAN), and/or other suitable communication technology.

Network interface 230 is a computer hardware component that connects network element 200 to a computer network (e.g., internet 120). Network interface 230 may connect network element 200 to a computer network via a wired or wireless connection.

Timer 265 may be any type of hardware, software, or hardware/software combination used for measuring time intervals. Timer 265 may be configured to increment or decrement a digital counter at a fixed frequency. Additionally, timer 265 may be configured to interrupt a processor (e.g., central processing unit 210) when the digital counter reaches a predetermined value. As described in detail below, timer 265 may be configured to provide the digital counter value to MTC device registration routine 300 and MTC device scheduling routine 400.

Transmitter 240 may be any type of hardware device that may generate, or otherwise produce, radio waves in order to communicate with one or more other devices. Transmitter 240 may be coupled with an antenna (not shown) in order to transmit data to one or more other devices. Transmitter 240 may be configured to receive digital data from one or more components of network element 200 via bus 220, and convert the received digital data into an analog signal for transmission over an air interface.

Receiver 250 may be any type of hardware device that can receive and convert a signal from a modulated radio wave into usable information, such as digital data. Receiver 250 may be coupled with an antenna (not shown) in order to capture radio waves. Receiver 250 may be configured to send digital data converted from a captured radio wave to one or more other components of network element 200 via bus 220.

In various embodiments, a transceiver (not shown) may be included with network element 200. A transceiver may be a single component configured to provide the functionality of transmitter 240 and receiver 250 as discussed above.

Figure 3:
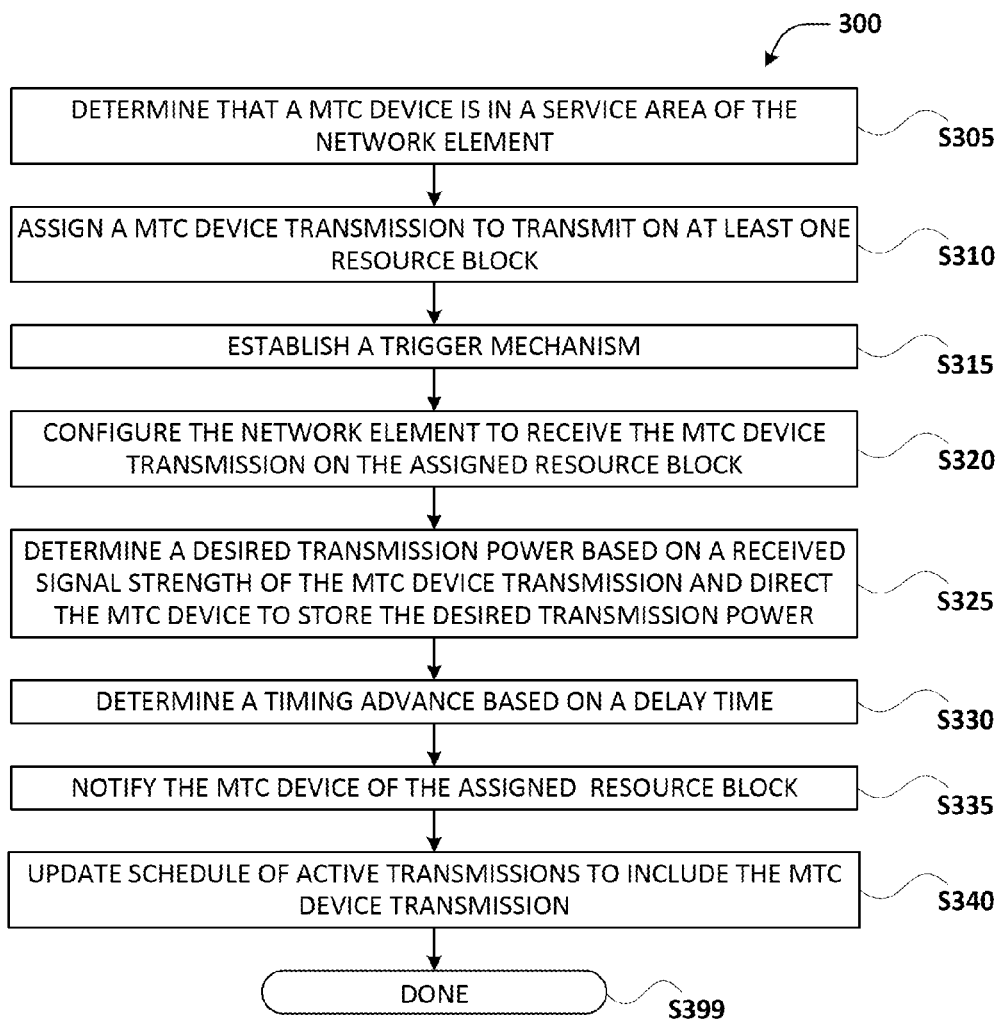
FIG. 3 shows a MTC device registration routine according to an example embodiment.

FIG. 3 shows a MTC device registration routine 300 according to an example embodiment. MTC device registration routine 300 may be used to register one or more MTC devices (e.g., MTC devices 115) within the cell coverage area (e.g., coverage area 106) of a network element (e.g., base station 105), and to pre-schedule MTC device transmissions (also known as "data reports") to be transmitted by a MTC device. For illustrative purposes, the operations of MTC device registration routine will be described as being performed by network element 200 and with any one of MTC devices 115, as shown in FIG. 1. However, it should be noted that base station 105 or other like network devices may operate MTC device registration routine 300 as described below.

As discussed above, the various signaling procedures for linking a user terminal with a base station may consume relatively large amounts of network resources. Accordingly, MTC device registration routine 300 may be used to schedule, or otherwise plan for MTC device transmissions to transmit on a resource block at a predetermined time (or during a predetermined event) in order to eliminate the need for the various signaling procedures. Thus, MTC device registration routine 300 may be thought of as "pre-scheduling" or "pre-allocating" network resources for a MTC device transmission to transmit at a future time.

As shown in step S305, network element 200 determines that a MTC device is in a service area of network element 200. According to various embodiments, a MTC device may be installed, or otherwise placed in the service area of an already-established network element. In such embodiments, the MTC device may send a signal to be received by one or more network elements. In various embodiments, a network element may send out a polling and/or reference signal to be received by one or more MTC devices in its service area. In various embodiments, a MTC device may be configured to initiate communications with a network element using the same or similar signaling protocols to those used by mobile terminals. Once network element 200 has determined that a MTC device is within the service area of network element 200, then network element may begin registering the MTC device. According to example embodiments, steps S310-S335 may be referred to as an "initial registration process". In various embodiments, the initial registration process may take place when the MTC device is initially power-up or when the MTC device initially camps on a cell.

As shown in step S310, network element 200 assigns a MTC device transmission to transmit on at least one resource block. In various embodiments, a resource block may be a predefined unit for which network element 200 allocates network resources based on time and carrier frequency. For example, according to the LTE wireless standard, a resource segment may be a frame of time lasting for 10 milliseconds (ms) and having associated sub-carrier frequencies. Each sub-carrier frequency has a bandwidth of 15 kHz. Each frame may be divided into 10 sub-frames of 1 ms each (it should be noted that sub-frames may be referred to as "time slots"). Additionally, each sub-frame may have associated sub-carrier frequencies. LTE further provides that a resource block may last for one time slot and may have twelve sub-carriers. Thus, in embodiments where network element 200 employs the LTE wireless standard, a resource block may have one time slot and twelve sub-carrier frequencies. Accordingly, network element 200 may be configured to "pre-assign" a MTC device transmission to transmit on one or more frames or resource blocks. The term "pre-assign" as used herein, may refer to assigning, scheduling, or otherwise planning for the use of network resources at a future time.

As shown in step S315, network element 200 establishes a trigger mechanism. A trigger mechanism may be any type of procedural code that automatically executes in response to an event. The trigger mechanism may be based on an application associated with the MTC device. Typically, triggers may include events such as sensor outputs, timer values (e.g., from timer 265), user actions, or messages from other applications (i.e., paging). Thus, MTC devices may be configured to transmit a MTC device transmission based on a trigger event taking place. In such embodiments, network element 200 may establish a trigger mechanism that corresponds to a MTC device's trigger event. Accordingly, when the trigger mechanism detects that a trigger event has occurred, network element 200 will "know" when to allocate network resources for receiving, demodulating, and decoding a MTC device transmission.

For example, MTC device that is an electricity meter may be configured to transmit an electricity usage report at 1:00 PM every day. In such instances, 1:00 PM is a timer-based trigger ("timer trigger"). Accordingly, network element 200 may establish a timer trigger that is triggered at 1:00 PM every day in order to allocate network resources for receiving, demodulating, and decoding the electricity meter's data report transmission.

By way of another example, a MTC device that is a heart rate meter may be pre-configured to transmit a heart rate data report when paged by another device or application. For example, a physician may use a tablet personal computer to send a request for the heart rate data report. In such instances, a received request for the heart rate data report is a paging-based trigger ("paging trigger"). Accordingly, network element 200 may establish a paging trigger that detects when a request for a MTC device transmission (e.g., the heart rate data report) occurs. In response to receiving a request for a MTC device transmission, network element 200 may send a page message to the heart rate meter, which requests the heart rate meter to transmit the heart rate data report. Network element 200 may then prepare to receive the heart rate meter's heart rate data report.

By way of yet another example, a MTC device that is an inventory meter may be configured to transmit an inventory report when an inventory of an item falls below a minimum number. In such instances, the minimum number of items is an event-based trigger ("event trigger"). The inventory meter may be configured to send an indication that an event has occurred (e.g., the inventory meter may indicate that the inventory has fallen below the minimum amount). Accordingly, network element 200 may establish an event trigger that detects when an event occurs at an MTC device. In such embodiments, the MTC device may send a message that notifies the network element 200 that an event has occurred. Upon receiving the message indicating that an event has occurred, network element 200 may send an acknowledgement message to the MTC device (e.g., the inventory meter). Once the acknowledgement message has been sent, network element 200 may then prepare to receive the inventory meter's inventory report on the pre-assigned resource block.

As shown in step S320, network element 200 configures itself (network element 200) to demodulate and decode the MTC device transmission according to a MTC device type. As discussed above with regard to step S310, network element 200 may allocate a MTC device transmission to transmit on one or more resource blocks. Thus, network element 200 may be thought of as "knowing" when a MTC device transmission is to occur at a future time (or during a future event) on a certain carrier or sub-carrier frequency. Accordingly, network element 200 may "pre-configure" itself to receive and decode the MTC device transmission during at least one frame or time slot for a given carrier or at least one given sub-carrier frequency. The term "pre-configure" used herein may refer to configuring or otherwise planning for the use of computing resources of a network element (e.g., network element 200) at a future time.

As shown in step S325, network element 200 determines a desired transmission power based on a received signal strength of the MTC device transmission and directs the MTC device to store the desired transmission power. A received signal strength may be a measure of power present in a received radio signal. In various embodiments, network element 200 may send a probe request to the MTC device, and in response, the MTC device may send a probe response to network element 200. Network element 200 may then use the probe response to determine a received signal strength. In various embodiments, the polling and/or reference signal sent by the MTC device (as discussed above with regards to step S305) may be used for determining received signal strength instead of using probe request and probe response.

Based on the received signal strength of the probe response or polling signal, the network element 200 may direct the MTC device to adjust the MTC device's transmission power level. In order to conserve network resources, the MTC device's transmission power level may be adjusted so that the MTC device transmits at the lowest transmission power necessary for the network element 200 to demodulate and decode MTC device transmissions. As is known, there may be several methods for determining a lowest transmission power necessary for demodulation and decoding transmission signals (which is beyond the scope of this invention, and therefore will not be described in detail herein).

Once the desired transmission power is determined, then the network element 200 may notify the MTC device to store its transmission power for future MTC device transmissions. In various embodiments, the network element 200 may direct the MTC device to store the received signal strength. For MTC devices that are stationary, the stored transmission power level may not have to be adjusted for future transmissions since the conditions surrounding the stationary MTC device may not significantly change. For MTC devices that are low mobility devices, the surrounding conditions may significantly change, which may require adjusting the stored transmission power level to account for the changing conditions. In various embodiments, the power level adjustments may be based on a open loop power control protocol.

Furthermore, the physical features within a network element's service area (e.g., cell coverage area 106) may change over time. For example, new buildings or other like structures may be built inside a network element's service area. Such structures may interfere with a MTC device transmission. Additionally, the MTC device may be moved to a different location within the network element's service area. In such instances, the MTC device may need to adjust the power level of the MTC device transmission in order for network element 200 to properly demodulate and decode the MTC device transmission. Therefore, network element 200 may be configured to notify the MTC device to adjust the stored transmission power level the received minimum signal strength of the MTC device transmission in order for the network element 200 to properly demodulate and decode the MTC device transmission.

In various embodiments, the MTC devices may also be configured to measure and store the strength of the polling and/or reference signals transmitted by network element 200 during the registration process (as discussed above with respect to step S305). Additionally, prior to transmitting a MTC device transmission, the MTC device may measure a signal strength of current reference signals being transmitted by the network element 200, and compare it with the stored transmission power level. If the signal strength of the current reference signals are greater than the stored transmission power level, the MTC device transmission power may be lowered. Otherwise, the stored transmission power level may be increased in order for the network element 200 to properly demodulate and decode the MTC device transmission.

As shown in step S330, network element 200 determines a timing delay based on a delay time. In various embodiments, the delay time may be based on a propagation delay and/or a delay associated with the internal circuitry of the network element 200 (i.e., an amount of time it takes for data to be processed and sent to a transmitter to be transmitted). Accordingly, in various embodiments, network element 200 may send a message to the MTC device directing the MTC device to adjust a transmission start time according to the timing advance.

The delay time may be based on a measured one way propagation delay ("one way delay" or "OWD") between the MTC device and the network element. The OWD may be a measure time for a signal that is sent by the network element 200 to be received by the MTC device. The OWD may be measured in order to maintain synchronization between network device 200 and the MTC device, such that the network element 200 is prepared to receive, demodulate, and decode the MTC device transmission during the pre-assigned time slot. Therefore, the MTC device transmission may be offset by a timing advance in order to account for the OWD. In embodiments where a timer trigger is employed, the timing advance may take into account the OWD because a message is not being sent in order for the trigger event to occur.

However, in embodiments where an event trigger or a paging trigger is used, the timing advance should be based on a round trip propagation delay ("round trip delay" or "RTD"). In such embodiments, the trigger event occurs in response to a message being sent by the MTC device or the network element 200. In such instances, a first OWD is experienced by the signal that is sent by the network element 200 to be received by the MTC device, and a second OWD is experienced when the MTC device transmits a signal that is received at network element 200. Therefore, in embodiments where an event trigger or a paging trigger is used, the timing advance may take into account the OWD experienced by transmissions being sent in both directions (i.e., a RTD).

As shown in step S335, network element 200 notifies the MTC device of the assigned resource block. Having completed initial registration process, the network element 200 may activate, or otherwise request the MTC device to transmit a MTC device transmission. However, as discussed above, network element 200 may "pre-schedule", or allocate network resources at a future time, for a MTC device transmission to transmit on one or more resource blocks. Thus, in various embodiments, network element 200 may wait until the pre-scheduled future time to activate the MTC device to transmit the MTC device transmission. In such embodiments, network element 200 may wait until a trigger event has occurred before activating or requesting the MTC device to transmit the MTC device transmission.

As shown in step S340, network element 200 updates a schedule of active transmissions to include the MTC device transmission. The schedule of active transmissions may be created using a proportional fair (PF) algorithm or other like scheduling algorithms as are known. A scheduling algorithm describes a schedule for every carrier of a group of sub-carriers at every time instant. It should be noted that a mobile terminal or MTC device may be allowed to simultaneously transmit on multiple sub-carriers via a link such that the schedule of active transmissions may specify, for a given time instant, the mobile terminals that are transmitting on each sub-carrier together with associated transmission rates without causing collisions or interference. In various embodiments, the schedule of active transmissions for mobile terminals may allocate resource blocks to the mobile terminals, so long as those resource blocks are not occupied by MTC devices currently transmitting MTC device transmissions. At the same time, one or more MTC devices that are triggered for transmission may occupy their pre-assigned resource blocks.

In various embodiments, a schedule map may be used in conjunction with a scheduling algorithm. The schedule map may be a schedule of future transmissions by the MTC devices. The schedule map may be pre-configured and stored at the network element 200 and activated when a trigger event occurs. In various embodiments, the schedule map may take into account the device type of MTC devices. In such embodiments, the schedule map may pre-assign MTC devices having the same device type to resource blocks of different sub-carrier frequencies having the same or similar time slots. Additionally, when the schedule map is not activated, the pre-assigned resource blocks for the MTC devices may be used for scheduling mobile terminal transmissions.

Once network element 200 updates the schedule of active transmissions to include the MTC device transmission, network element 200 is done registering the MTC device, as shown in step S399. It should be noted that because the MTC device has undergone the registration process as described above, network element 200 may establish a communications link with the MTC device without the need to initiate any control and/or signaling procedures with the MTC device as described below with respect to FIG. 4.

Figure 4:
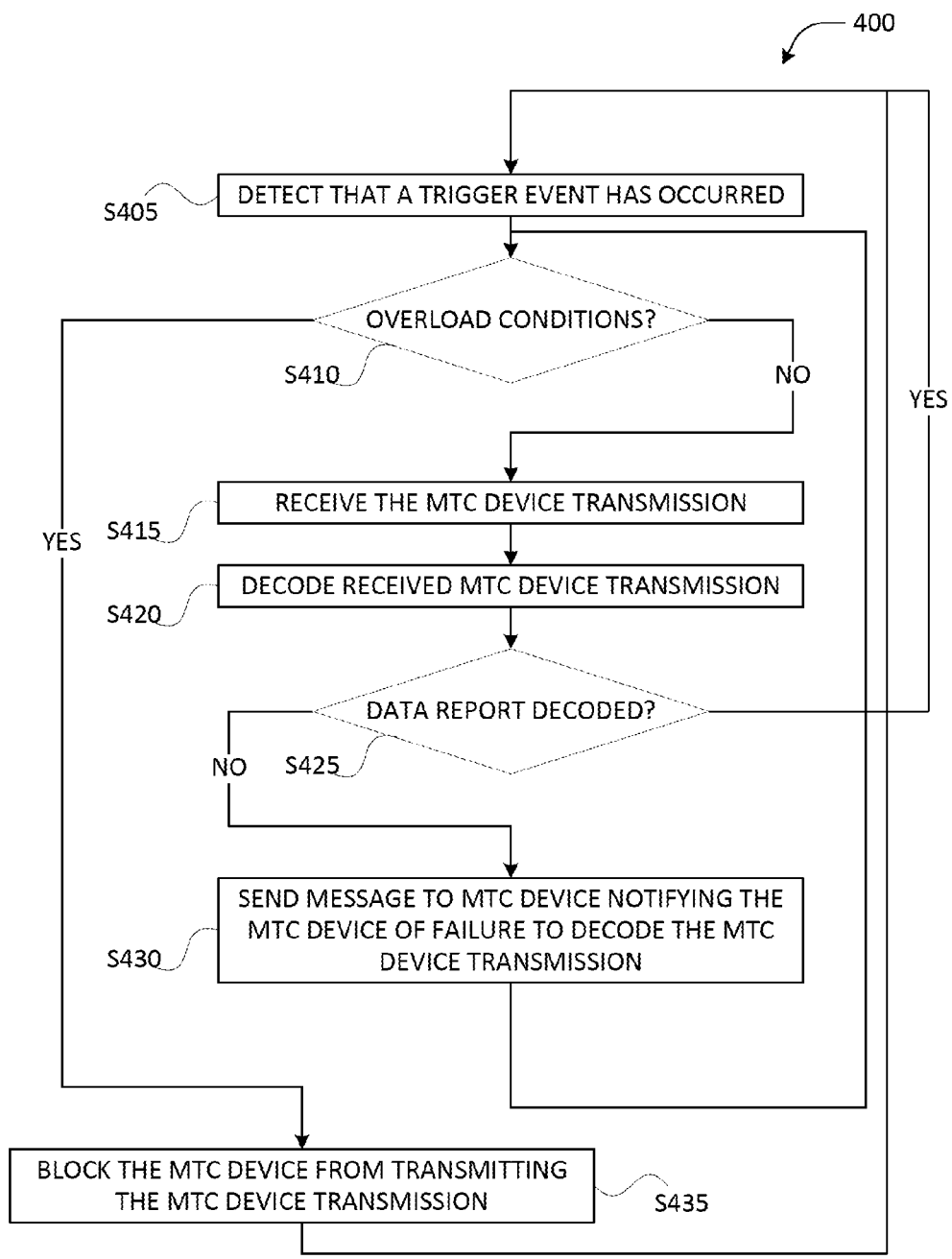
FIG. 4 shows a MTC device scheduling routine according to an example embodiment.

FIG. 4 shows a MTC device scheduling routine 400 according to an example embodiment. MTC device scheduling routine 400 may be used to schedule one or more MTC devices (e.g., MTC devices 115) within a cell coverage area (e.g., coverage area 106) of a network element (e.g., base station 105) to transmit one or more MTC device transmissions (also known as "data reports"). In an exemplary embodiment, MTC device scheduling routine 400 takes place after a MTC device is registered by network element 200 using MTC device registration routine 300, as discussed above. For illustrative purposes, the operations of MTC device scheduling routine 400 will be described as being performed by network element 200. However, it should be noted that base station 105, as shown in FIG. 1, or other like network devices may operate MTC device scheduling routine 400 as described below.

As shown in step S405, network element 200 detects that a trigger event has occurred. As discussed above, network element 200 establishes a trigger mechanism during the registration process. In step S405, the established trigger mechanism is activated or otherwise initiated on network element 200 when a trigger event takes place.

If the trigger is a timing trigger, a corresponding timing trigger is simultaneously activated on the MTC device. For example, if the trigger is a timer trigger set to activate at 1:00 PM, both the timing trigger on network element 200 and the timing trigger on the MTC device are activated or otherwise initiated simultaneously at 1:00 PM. If the trigger mechanism is a paging trigger, a corresponding paging trigger is established on network element 200, such that network element 200 may page the MTC device in response to receiving a data request from another device or application. If the trigger mechanism is an event trigger, a corresponding event trigger is established on the network element 200, such that network element 200 is configured to receive a message indicating that an event has occurred from the MTC device and in response, an acknowledgement message may be sent to the MTC device that initiates the transmission of the MTC device transmission.

As shown in step S410, network element 200 determines if overload conditions are occurring (or have occurred) in a service area associated with network element 200 (e.g., cell coverage area 106). If at step S410, network element 200 determines that overload conditions have occurred, then in step S440, network element 200 blocks the MTC device from transmitting the MTC device transmission.

Overload conditions may occur when nearly all network resources are allocated to mobile devices and/or other MTC devices in a cell coverage area. As is known, there may be several methods for determining overload conditions (which is beyond the scope of this invention, and therefore will not be described in detail herein).

It should be noted that typically, MTC device transmissions may be a data report with a relatively small amount of data. Because of their small size, in many instances, the transmission time for these data reports may be flexible. For example, many MTC device transmissions may be transmitted in "bursts", or may be delayed to be transmitted at a different time. In such instances, the MTC device transmissions may have a lower priority than other types of data transmissions (e.g., streaming audio or video data), where data transmissions with a higher priority are given access to network resources before lower data transmissions. Therefore, if network element 200 determines that overload conditions have occurred, then network element 200 may broadcast, or otherwise notify the MTC device not to transmit the MTC device transmission in order to allow higher priority data transmissions to continue transmitting. In various embodiments, overload conditions may be detected for a range of sub-carrier frequencies. In such embodiments, network element 200 may broadcast, or otherwise notify the MTC devices not to transmit MTC device transmissions whose pre-assigned sub-carriers are within the frequency range experiencing overload conditions. The resource blocks being blocked from MTC device transmissions are use are released for scheduler to schedule other transmissions for example for the transmission of normal UEs.

In various embodiments, when overload conditions are detected, network element 200 may block all MTC devices from transmitting in order to allow other devices to continue transmitting. However, in some embodiments, network element 200 may block MTC devices from transmitting based on MTC device type.

Once network element 200 blocks the resource blocks assigned to the MTC devices, network element 200 then loops back to step S405 and waits for a trigger is triggered on network element 200.

If network element 200 determines that overload conditions have not occurred, network element 200 allows the MTC device to transmit the MTC device transmission on the at least one assigned resource block. As shown in step S415, network element 200 receives the MTC device transmission. It is assumed that network element 200 has already scheduled the MTC device transmission to transmit on a resource block during the registration process as described above with respect to FIG. 3. Thus, network element 200 may allocate the necessary network resources to the MTC device to transmit the MTC device transmission on the pre-assigned resource blocks. It should be noted that because the MTC device has already undergone the registration process, network element 200 may allocate the necessary network resources for receiving and processing the MTC device transmission without the need to initiate any control and/or signaling procedures with the MTC device.

As shown in step S420, network element 200 receives the MTC device transmission, and as shown in step S425, network element 200 decodes the received the MTC device transmission. As is known, there may be several methods for receiving and decoding device transmissions in wireless communication systems (which is beyond the scope of this invention, and therefore will not be described in detail herein).

As shown in step S430, network element 200 determines if the data report has been decoded. If at step S430, network element 200 determines that the data report (i.e., the MTC device transmission) has been decoded, network element 200 loops back to step S405 in order to detect if a trigger event has occurred.

If at step S430, network element 200 determines that the data report has not been successfully decoded, in step S435, network element 200 sends a message to the MTC device notifying the MTC device of the failure to decode the data report.

Referring back to step S435, network element sends a message to the MTC device notifying the MTC device of the failure to decode the data report (i.e., the MTC device transmission). In various embodiments, the message may include one or more reasons why network element 200 failed to decode the MTC device transmission. In various embodiments, the message may include a request for the MTC device to re-transmit the MTC device transmission. Additionally, network element 200 may not have been able to decode the MTC device transmission because the MTC device transmission was transmitted below a minimum required power level. Accordingly, in various embodiments, the message may include a request for the MTC device to re-transmit the MTC device transmission at a higher power level, as determined by network element 200. Once the message is sent, network element 200 then loops back to step S410 to determine if overload conditions have occurred because the trigger event has already occurred on network element 200.

FIG. 5 illustrates a timing and synchronization diagram 500 according to an example embodiment. For illustrative purposes, timing and synchronization diagram 500 will be described as taking place between network element 200 and an MTC device. However, it should be noted that the timing and synchronization may occur between base station 105 and MTC device 115, as shown in FIG. 1.

It should be noted that certain delays may occur when operating a communications network, such as communications network 100, as shown in FIG. 1. For example, propagation delay (i.e., an amount of time it takes for a signal to travel from a transmitting device to a receiving device) or a delay associated with the internal circuitry of network element 200 (i.e., an amount of time it takes for data to be processed and sent to a transmitter to be transmitted) may occur. Therefore, network element 200 may take into account these various types of delay when scheduling MTC device transmissions. As is known, there may be several methods for determining propagation delay and delays associated with an internal circuitry of a device (such methods are beyond the scope of this invention, and therefore will not be described in detail herein).

Timing and synchronization diagram 500 includes network element system timing 500A, local reference timing 500B, transmission timing 500C, and receiving timing 500D; each showing a set of two resource blocks and each divided into ten time slots 501. Each time slot 501 is 1 ms in length. In various embodiments, each time slot may be measured in flops, or any other like measure of computer performance.

Network element system timing 500A shows a timing of events occurring at network element 200. Local reference timing 500B shows a timing of events occurring at the MTC device. Transmission timing 500C shows a timing of MTC device transmission signals being transmitted by the MTC device. Receiving timing 500D shows a timing of the MTC device transmission signals that are received at network element 200. Additionally, timing and synchronization diagram 500 includes reference timing boundaries 520 for points of reference.

Timing and synchronization diagram 500 also includes trigger 510 showing a time when a trigger event occurs on the network element 200. As discussed above, network element 200 may have already pre-assigned the MTC device transmission to transmit on a resource block once the trigger event occurs. Therefore, once the trigger event occurs, network element 200 may begin allocating the necessary network resources for the MTC device to transmit the MTC device transmission.

Trigger 525 shows a time when the trigger event occurs on the MTC device. In various embodiments, when a MTC device employs a timing trigger, the MTC device and network element 200 may be configured to initiate their respective trigger mechanisms at the same time (e.g., a data report is triggered at 11:00 AM, then triggers 510 and 525 are activated at 11:00 AM). Accordingly, network element system timing 500A and local reference timing 500B are initiated simultaneously. In other words, network element system timing 500A and local reference timing 500B are synchronized. Thus, network element system timing 500A and local reference timing 500B are aligned, as shown. Additionally, receiving timing 500D at network element 200 is also aligned with network element system timing 500A and local reference timing 500B because the timing advance 530 has been applied to the MTC device transmission as determined by network element 200. In other words, receiving timing 500D is synchronized with network element system timing 500A and local reference timing 500B due to timing advance 530.

Trigger reference 535 shows a reference point on when triggers 510 and 525 begin relative to transmission timing 500C and receiving timing 500D.

In embodiments where a timer trigger is used, propagation delay 545 is a one way propagation delay ("one way delay" or "OWD"). The OWD is measured between network element 200 and the MTC device in order to maintain the timing alignments. Therefore, transmission timing 500C (showing a timing of the MTC device transmission signals being transmitted by the MTC device) is offset by timing advance 530 in order to account for the OWD. As shown, timing advance 530 requires the MTC device to begin transmitting the MTC device transmission signals after the timing trigger is activated and following one or more advanced transmission frames or slot boundaries. In other words, timing advance allows the MTC device to transmit the MTC device transmission early in order to account for a timing delay, such as the OWD. Thus, timing advance 530 allows receiving timing 500D to synchronize with network element system timing 500A so that network element 200 is prepared to receive, demodulate, and decode the MTC device transmission during its pre-assigned time slots.

In various embodiments, where a paging trigger is employed by the MTC device, the MTC device transmission is not sent until after network element 200 sends a page message to the MTC device. Therefore, local reference timing 500B is initiated after network element system timing 500A. Thus, in such embodiments, network element system timing 500A and local reference timing 500B would not be aligned (not shown). Additionally, receiving timing 500D at network element 200 would also be aligned with network element system timing 500A (not shown) because the timing advance 530 has been applied to the MTC device transmission as determined by network element 200. In other words, receiving timing 500D would be synchronized with network element system timing 500A.

In embodiments where a paging trigger is used, the page message received at the MTC device experiences a OWD. Additionally, another OWD is experienced when the MTC device transmission is received at network element 200. Thus, in embodiments where a paging trigger is used, timing advance 530 should be based on a round trip propagation delay ("round trip delay" or "RTD"). In such embodiments, propagation delay 545 is a measured RTD pre-configured to the MTD devices having applications that require paging triggers. Accordingly, transmission timing 500C would be offset by timing advance 530, which takes into account the RTD between the MTC device and network element 200. Timing advance 530 requires the MTC device to begin transmitting the MTC device transmission signals after the paging trigger is activated (not shown) but with a less delay as compared with the delay between the paging trigger activation and the schedule map activation (e.g., schedule map activation 515). Thus, timing advance 530 allows transmission timing 500C to synchronize with network element system timing 500A so that network element 200 is prepared to receive the MTC device transmission during the pre-assigned time slots.

In various embodiments, where an event trigger is employed by the MTC device, the MTC device transmission is not sent until the MTC device sends a message indicating that an event has occurred and network element 200 sends an acknowledgement message to the MTC device. Therefore, local reference timing 500B would be initiated after network element system timing 500A. Thus, in such embodiments, network element system timing 500A and local reference timing 500B would not be aligned (not shown). Additionally, receiving timing 500D at network element 200 would also be aligned with network element system timing 500A (not shown because the timing advance 530 has been applied to the MTC device transmission as determined by network element 200. In other words, receiving timing 500D would be synchronized with network element system timing 500A.

In embodiments where an event trigger is used, the acknowledgement message received at the MTC device experiences a OWD. Additionally, another OWD is experienced when the MTC device transmission is received at network element 200. Thus, in embodiments where an event trigger is used, timing advance 530 should be based on a round trip propagation delay ("round trip delay" or "RTD"). In such embodiments, propagation delay 545 is a measured RTD. Accordingly, transmission timing 500C is offset by timing advance 530, which takes into account the RTD between the MTC device and network element 200. In various embodiments, timing advance 530 may also take into account delays associated with the internal circuitry of network element 200. Timing advance 530 requires the MTC device to begin transmitting the MTC device transmission signals before the event trigger is triggered (not shown). Thus, timing advance 530 allows transmission timing 500C to synchronize with network element system timing 500A so that network element 200 is prepared to receive the MTC device transmission during the pre-assigned time slots.

Schedule map activation 515 shows a time when the schedule map located on network element 200 is activated. When the schedule map located on network element 200 is activated, network element 200 begins allocating the necessary network resources in order to receive, demodulate, and decode the MTC device transmission. Schedule map duration 515A shows a time period or length of time for the pre-scheduled resource block to remain "open" for the MTC device transmission. As shown, schedule map duration 515A ends at reference timing boundary 520.

Transmission start 540 shows a time when a pre-scheduled MTC device transmission being transmitted by the MTC device begins. Transmission start 540A may indicate a time that the MTC device begins sending MTC device transmission signals over an air interface. As shown, transmission start 540 occurs after schedule map activation 515 due to timing advance 530. Thus, the MTC device transmission will be received at network element 200 during its pre-assigned time slot. Transmission duration 540A shows a time period or length of time for the pre-scheduled MTC device transmission being transmitted by the MTC device. As shown, transmission duration 540A ends at reference timing boundary 520.

Receiving start 550 shows a time when the pre-scheduled MTC device transmission being transmitted by the MTC device is first received by network element 200. Receiving start 550 indicates that network element 200 has allocated the necessary network resources to receive and process the MTC device transmission. As shown, receiving start 550 is aligned with schedule map activation 515 indicating that network element 200 allocates the necessary network resources to receive the MTC device transmission when the schedule map is activated, without the need for signaling procedures to take place prior to the MTC device transmission. In various embodiments, network element 200 may begin demodulating and decoding the MTC device transmission once it is received without waiting for the entire signal to be received (i.e., in real-time). Receiving during 550A shows a time period or length of time for the pre-scheduled MTC device transmission being received by network element 200. As shown, receiving duration 550A ends at reference timing boundary 520.

As will be appreciated, the method and apparatus according the example embodiments has several advantages. First, the example embodiments allow for the registration of MTC devices within a cell coverage area in order to pre-allocate network resources for MTC device transmissions, replacing the control signaling and/or negotiation procedures between network elements and MTC devices, thus reducing overhead by conserving network resources. Second, the example embodiments allow for easy implementation because the methods and systems as discussed above may be used by already-established network elements. Third, the example embodiments utilize the existing scheduling technology, and hence additional processing is minimal.

The invention being thus described, it will be obvious that the same may be varied in many ways. Such variations are not to be regarded as a departure from the invention, and all such modifications are intended to be included within the scope of the present invention.

I claim:

1. A method of registering a Machine Type Communications (MTC) device for scheduling MTC device transmissions by a network element, the method comprising:
    registering, by the network element, a MTC device, the registering including,
    assigning at least one resource block to the MTC device for transmitting at least one MTC device transmission,
    establishing a triggering mechanism that detects when a trigger event occurs such that when the trigger event occurs the network element receives the at least one MTC device transmission from the MTC device on the assigned at least one resource block, and
    configuring the network element to receive the at least one MTC device transmission based on the assigned resource block and the established triggering mechanism; and
    allowing, by the network element, the MTC device to transmit over the at least one resource block assigned during the registering,
    determining a timing advance for the MTC device based on a delay time,
    the delay time being based on a measured round trip propagation delay between the MTC device and the network element if the trigger mechanism is one of a paging trigger and an event trigger, and
    the delay time being based on a measured one way propagation delay between the MTC device and the network element if the trigger mechanism is a timer trigger; and sending a message to the MTC device directing the MTC device to adjust a transmission start time according to the timing advance.

2. The method of claim 1, further comprising: updating, by the network element, a schedule of active transmissions to include the at least one MTC device transmission to be transmitted on the assigned at least one resource block such that when the trigger event occurs the at least one MTC device transmission is transmitted on the assigned at least one resource block, the schedule of active transmissions scheduling at least one mobile terminal transmission to be transmitted on at least one resource block not assigned to the MTC device if at least one mobile terminal is within a service area of the network element.

3. The method of claim 1, wherein
the assigning assigns the at least one MTC device transmission to at least one time slot and at least one sub-carrier frequency of at least one resource block according to a start time of the at least one MTC device transmission and a maximum data size of the at least one MTC device transmission, and
the configuring configures the network element to demodulate and decode the at least one MTC device transmission during the at least one time slot on the at least one sub-carrier frequency.

4. The method of claim 1, wherein the registering further includes,
determining a received signal strength of the at least one MTC device transmission;
determining a desired transmission power of the at least one MTC device transmission based on the determined received signal strength;
notifying the MTC device to store the received signal strength and the desired transmission power as a reference transmission power for the MTC device, the MTC device using the reference transmission power to adjust future MTC device transmission power levels according to an open loop power control protocol.

5. The method of claim 1, wherein the trigger mechanism is one of,
the timer trigger and the network element receives the at least one MTC device transmission on the assigned at least one resource block according to a cycle period of a timer associated with an application of the at least one MTC device,
the paging trigger and the network element receives the at least one MTC device transmission on the assigned at least one resource block after the network element sends a page message to the MTC device requesting the at least one MTC device transmission,
the event trigger and the network element receives the at least one MTC device transmission on the assigned at least one resource block after the network element sends the MTC device an acknowledgement message acknowledging that an event has occurred at the MTC device.

6. The method of claim 1, further comprising:
detecting that a trigger event has occurred based on the trigger mechanism; in response to the trigger event occurring, receiving the at least one MTC device transmission from the at least one MTC device on the assigned at least one resource block;
decoding the at least one MTC device transmission; and
sending a message to the at least one MTC device if the network element fails to decode the at least one MTC device transmission.

7. The method of claim 6, further comprising:
determining a received signal strength of the at least one MTC device transmission, the received signal strength being based on a current transmission power of the at least one MTC device transmission; and
sending a message to the MTC device, the message directing the MTC device to, store the current transmission power for transmitting future MTC device transmissions if the network element is able to demodulate and decode the at least one MTC device transmission,
re-transmit the at least one MTC device transmission with increased power after a delay if the network element fails to demodulate and decode the at least one MTC device transmission.

8. The method of claim 6, further comprising:
determining that overload conditions have occurred;
broadcasting, by the network element, to the MTC device to not transmit the at least one MTC device transmission on the assigned at least one resource block; and blocking the MTC device transmission from transmitting the at least one MTC device transmission on the assigned at least one resource block to allow user terminals and other MTC devices within a service area of the network element to continue transmitting.

9. A method of scheduling registered Machine Type Communications (MTC) device transmissions by a network element, the method comprising:
detecting, by the network element, that a trigger event has occurred based on a trigger mechanism; and
receiving, by the network element, a MTC device transmission from a MTC device associated with the trigger event over a resource block based on the detecting, the resource block being previously assigned to the MTC device such that the network element is not required to perform a signaling procedure with the MTC device in order to transmit the MTC device transmission,
receiving a message including a determined timing advance based on a delay time, the delay time being based on a measured round trip propagation delay between the MTC device and the network element if the trigger mechanism is one of a paging trigger and an event trigger, and the delay time being based on a measured one way propagation delay between the MTC device and the network element if the trigger mechanism is a timer trigger; and
adjusting a start time of the MTC device according to the timing advance.

10. A method of transmitting a Machine Type Communications (MTC) device transmission by a MTC device that is registered with a network element, the network element scheduling MTC device transmissions, the method comprising:
receiving, by the MTC device, a message indicating that the MTC device is registered with a network element, and at least one resource block assigned to the MTC device to transmit on;
transmitting, by the MTC device, the at least one MTC device transmission over the assigned at least one resource block when a trigger event occurs, the at least one resource block being previously assigned to the MTC device by the network element,
receiving a message including a determined timing advance based on a delay time the delay time being based on a measured round trip propagation delay between the MTC device and the network element if the trigger mechanism is one of a paging trigger and an event trigger, and
the delay time being based on a measured one way propagation delay between the MTC device and the network element if the trigger mechanism is a timer trigger; and
adjusting a start time of the MTC device according to the timing advance.

11. The method of claim 10, wherein the trigger event is one of,
- a timer trigger and the MTC device transmits the at least one MTC device transmission on the assigned at least one resource block according to a cycle period of a timer associated with an application of the MTC device,
- a paging trigger and the MTC device transmits the at least one MTC device transmission on the assigned at least one resource block in response to receiving a page message from the network element, the page message requesting the at least one MTC device transmission,
- an event trigger and the MTC device transmits the at least one MTC device transmission on the assigned at least one resource block in response to receiving an acknowledgement message from the network element, the acknowledgment message indicating that the network element received a message indicating that the trigger event occurred at the MTC device.

12. The method of claim 11, further comprising:
receiving a message from the network element directing the MTC device to adjust a transmission start time according to a timing advance, the timing advance being based on a delay time determined by the network element,
the delay time being based on a measured round trip propagation delay between the MTC device and the network element if the trigger is one of a paging trigger and an event trigger, and
the delay time being based on a measured one way propagation delay between the MTC device and the network element if the trigger is a timer trigger.

13. The method of claim 10, further comprising:
receiving a message directing the MTC device to,
store a current transmission power for transmitting future MTC device transmissions if the network element is able to demodulate and decode the at least one MTC device transmission, the current transmission power being a transmission power of the at least one MTC device transmission,
re-transmit the at least one MTC device transmission with increased power after a delay if the network element fails to demodulate and decode the at least one MTC device transmission.

14. The method of claim 10, further comprising:
receiving a message directing the MTC device to not transmit the at least one MTC device transmission on its assigned resource block due to overload conditions occurring in a service area of the network element.

15. A method of scheduling registered Machine Type Communications (MTC) device transmissions by a network element, the method comprising:
detecting, by a MTC device, that a trigger event has occurred; and
transmitting, by the MTC device, a MTC device transmission over a resource block, the resource block being previously assigned to the MTC device such that the MTC device is not required to perform a signaling procedure with the network element in order to transmit the MTC device transmission
sending a message including a determined timing advance based on a delay time, the delay time being based on a measured round trip propagation delay between the MTC device and the network element if the trigger mechanism is one of a paging trigger and an event trigger, and the delay time being based on a measured one way propagation delay between the MTC device and the network element if the trigger mechanism is a timer trigger; and
adjusting a start time of the MTC device according to the timing advance.

\* \* \* \* \*